United States Patent
Enomoto et al.

(10) Patent No.: US 11,205,935 B2
(45) Date of Patent: Dec. 21, 2021

(54) AXIAL GAP DYNAMO-ELECTRIC MACHINE

(71) Applicant: Hitachi, Ltd., Tokyo (JP)

(72) Inventors: Yuji Enomoto, Tokyo (JP); Hirooki Tokoi, Tokyo (JP); Kenta Deguchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 196 days.

(21) Appl. No.: 16/488,282

(22) PCT Filed: Nov. 1, 2017

(86) PCT No.: PCT/JP2017/039500
§ 371 (c)(1),
(2) Date: Aug. 23, 2019

(87) PCT Pub. No.: WO2018/168058
PCT Pub. Date: Sep. 20, 2018

(65) Prior Publication Data
US 2020/0006998 A1     Jan. 2, 2020

(30) Foreign Application Priority Data
Mar. 14, 2017   (JP) .............................. JP2017-047977

(51) Int. Cl.
*H02K 5/08*     (2006.01)
*H02K 5/02*     (2006.01)
*H02K 21/24*    (2006.01)

(52) U.S. Cl.
CPC .................. *H02K 5/08* (2013.01); *H02K 5/02* (2013.01); *H02K 21/24* (2013.01); *H02K 2205/12* (2013.01)

(58) Field of Classification Search
CPC ............ H02K 5/08; H02K 21/24; H02K 5/02; H02K 1/2793; H02K 3/325; H02K 3/345; H02K 2205/12
See application file for complete search history.

(56) References Cited

U.S. PATENT DOCUMENTS 5,514,922 A * 5/1996 Yabushita ................ H02K 3/38
310/45
9,407,124 B2 * 8/2016 Minari ...................... H02K 5/22
(Continued)

FOREIGN PATENT DOCUMENTS

JP    58-179857 U   12/1983
JP    59-69658 U    5/1984
(Continued)

OTHER PUBLICATIONS

International Search Report (PCT/ISA/210) issued in PCT Application No. PCT/JP2017/039500 dated Jan. 9, 2018 with English translation (four (4) pages).
(Continued)

*Primary Examiner* — Naishadh N Desai
(74) *Attorney, Agent, or Firm* — Crowell & Moring LLP

(57) ABSTRACT

The purpose of the present invention is to obtain a structure with which it is possible to improve the heat dissipation performance and efficiency of an axial gap dynamo-electric machine. Accordingly, the present invention is an axial gap dynamo-electric machine of such construction that a disc-shaped rotor in which permanent magnets are disposed is provided in the axial direction and a stator is disposed in the axial-direction center portion, wherein the outer circumferential side of a stator winding is in intimate contact with the inside diameter of a housing, embedding with a mold resin is used for the housing and a stator core and for a stator coil and the housing so that a connection is established with the housing, and the housing comprises a nonmagnetic, electrically nonconductive material.

10 Claims, 10 Drawing Sheets

(56) References Cited

U.S. PATENT DOCUMENTS

| | | | |
|---|---|---|---|
| 2011/0309726 A1* | 12/2011 | Carpenter | H02K 5/1282 |
| | | | 310/75 R |
| 2013/0328429 A1 | 12/2013 | Enomoto et al. | |
| 2014/0009009 A1* | 1/2014 | Deguchi | H02K 9/22 |
| | | | 310/43 |
| 2015/0372544 A1* | 12/2015 | Iwasaki | H02K 1/18 |
| | | | 310/43 |
| 2016/0344265 A1* | 11/2016 | Enjoji | H02K 21/24 |
| 2017/0321795 A1* | 11/2017 | Rosengren | H02K 5/1735 |

FOREIGN PATENT DOCUMENTS

| | | |
|---|---|---|
| JP | 62-171437 A | 7/1987 |
| JP | 5-122887 A | 5/1993 |
| JP | 6-327208 A | 11/1994 |
| JP | 9-219950 A | 8/1997 |
| JP | 2008-92735 A | 4/2008 |
| JP | 2008-199811 A | 8/2008 |
| JP | 2013-90391 A | 5/2013 |
| JP | 2013-143853 A | 7/2013 |
| JP | 2014-17915 A | 1/2014 |
| JP | 5635921 B2 | 12/2014 |
| JP | 2016-220373 A | 12/2016 |

OTHER PUBLICATIONS

Japanese-language Written Opinion (PCT/ISA/237) issued in PCT Application No. PCT/JP2017/039500 dated Jan. 9, 2018 (10 pages).

* cited by examiner

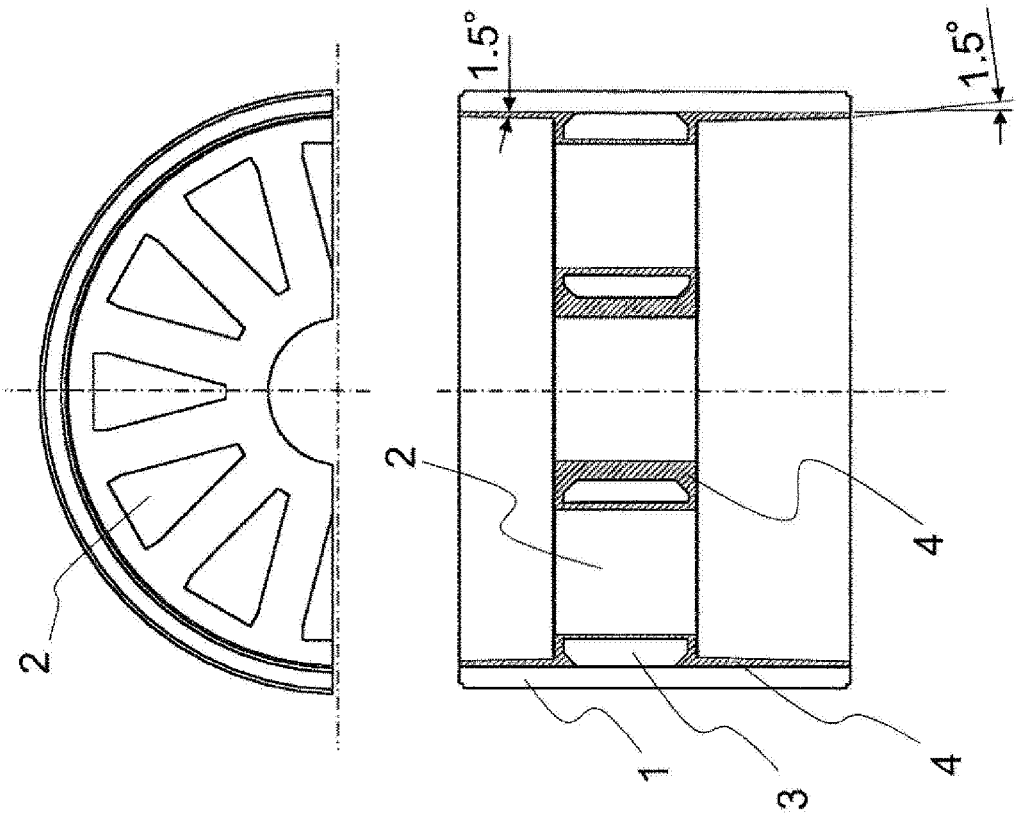
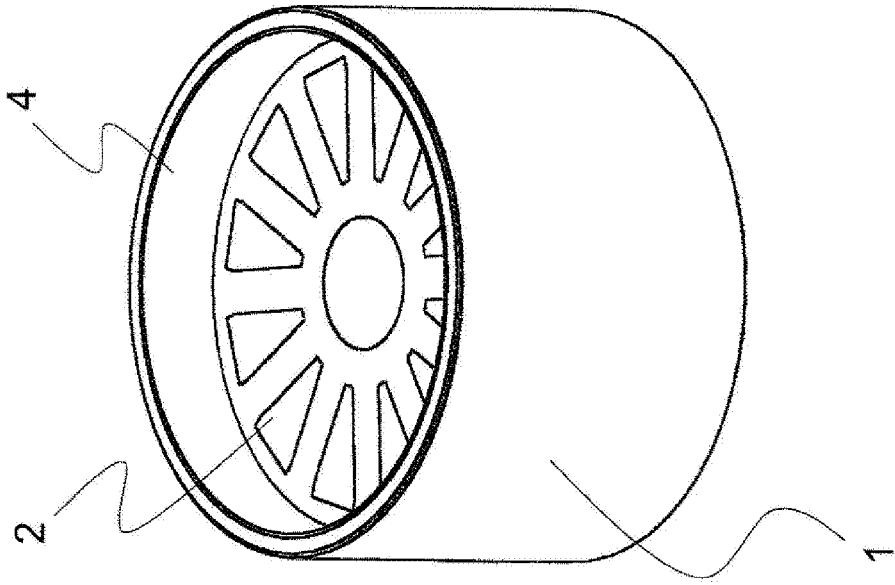

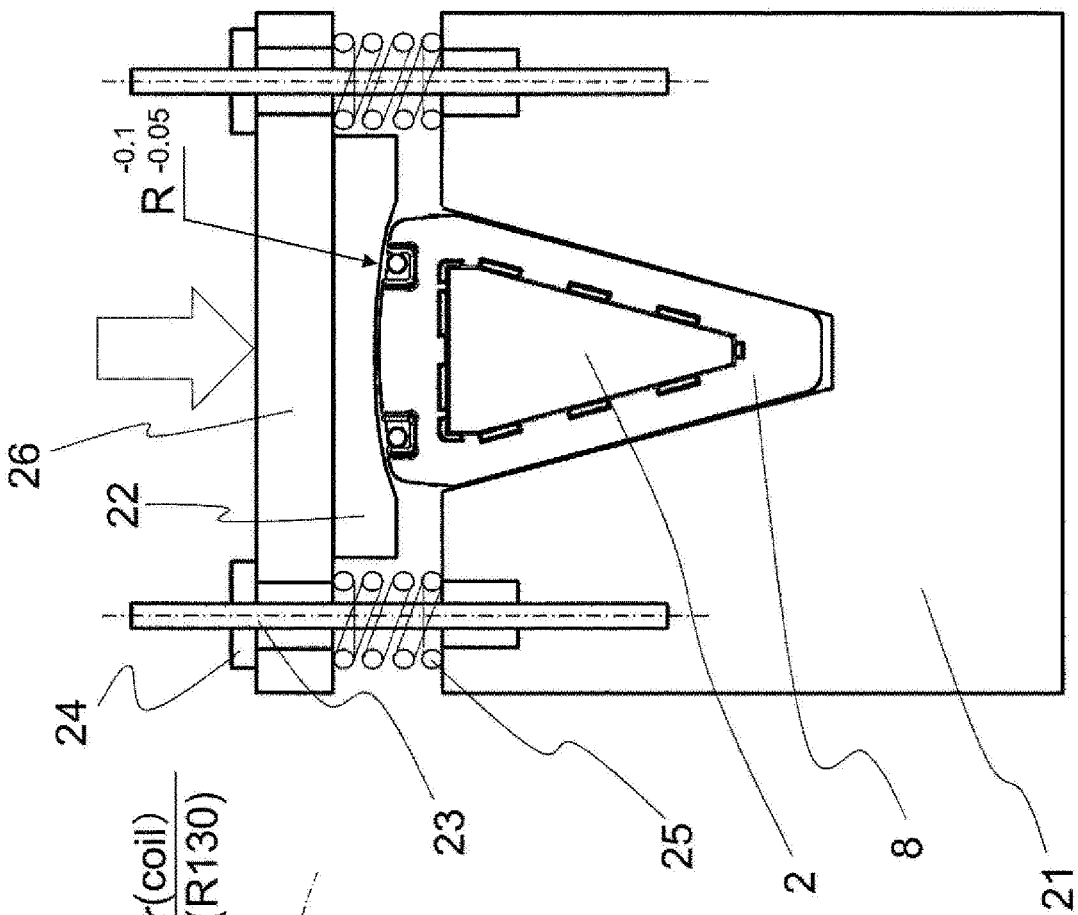
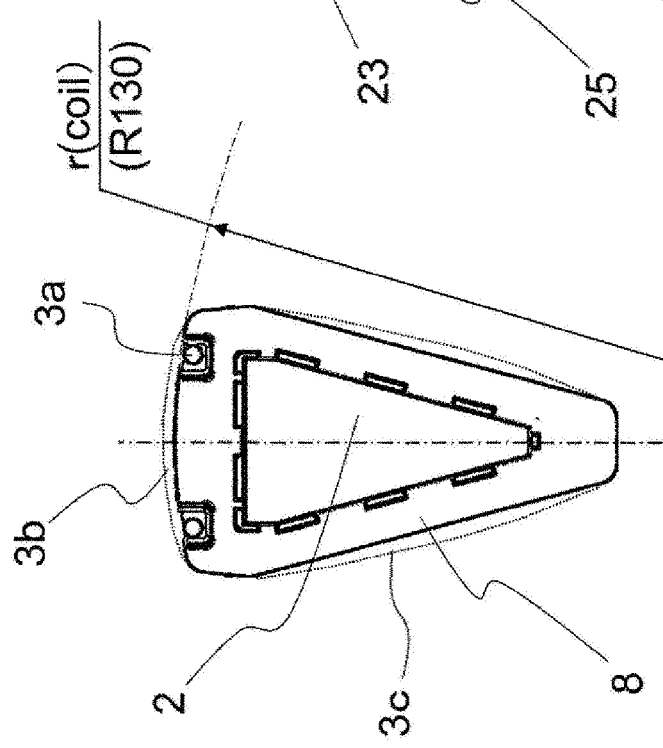

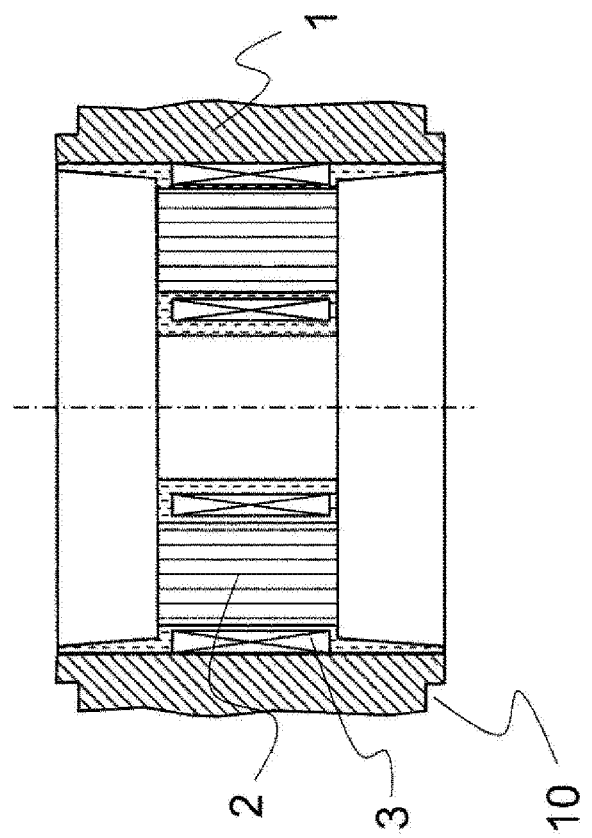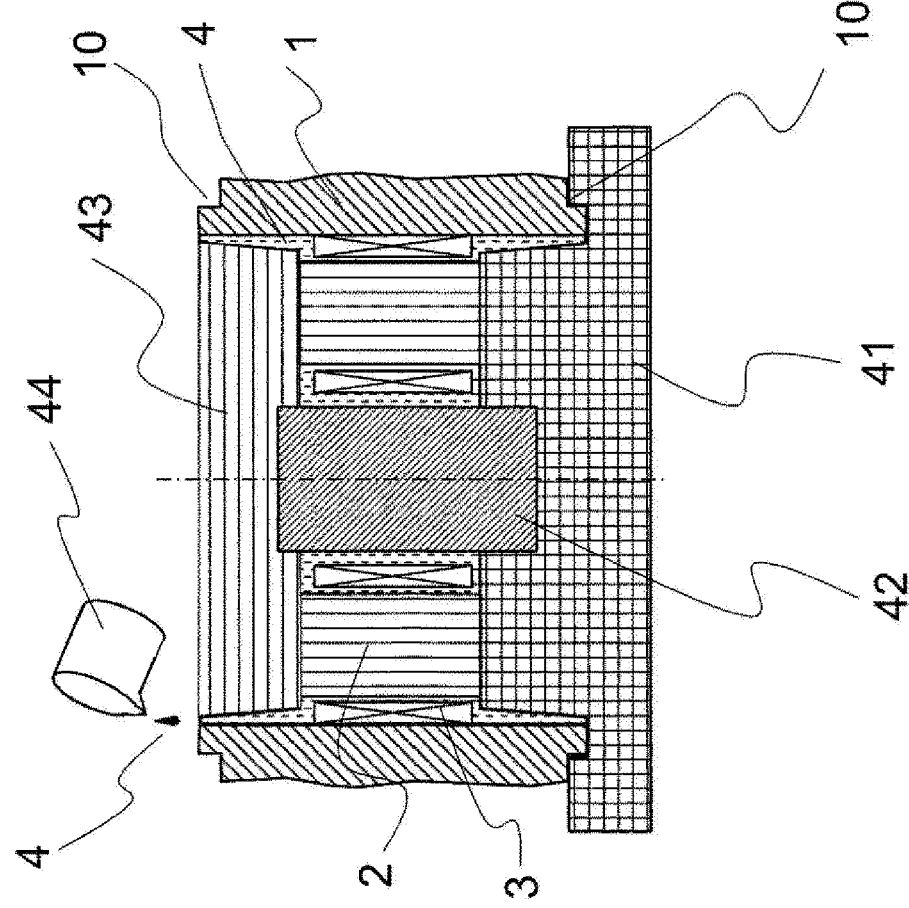

AXIAL GAP DYNAMO-ELECTRIC MACHINE

TECHNICAL FIELD

The present invention relates to a housing material and a structure of an axial gap-type dynamo-electric machine, and a stator holding structure.

BACKGROUND ART

As a dynamo-electric machine used as a power source of an industrial machine, the axial gap dynamo-electric machine is characterized by a reduction in thickness, high inertia, high efficiency or the like of a motor portion. Therefore, the axial gap dynamo-electric machine has been used for various use purposes. The axial gap dynamo-electric machine has a structure with a disc-shaped rotor having a relatively large diameter as compared with a general radial dynamo-electric machine. Therefore, when a motor is configured within a prescribed diameter, since the diameter of the disc may be large, the axial gap dynamo-electric machine has a feature that it is possible to obtain a larger torque as compared with a radial motor. When a far larger torque is expected, it is possible to configure an axial gap dynamo-electric machine having a structure with two rotors in an axial direction with respect to one stator. This method, since a large number of permanent magnets, which are field magnet sources, can be disposed on the disc, can increase the amount of magnetic flux that contributes to torque generation.

PTL 1 proposes a method related to high efficiency of an axial gap motor having one stator and two rotors. It is proposed as a structure in which an iron core formed of an amorphous metal foil strip with which loss is small is used for an iron core portion of the stator and a material with which loss, e.g., eddy current loss, is small is used for the rotor magnet such that the losses to be generated can be suppressed, enabling an increase in efficiency of the motor.

Meanwhile, an axial gap motor having two stators with respect to one rotor has also been studied. This structure is advantageous in that the mechanical strength can be increased because a surface of a back yoke portion of the stator can be fastened to a casing portion, e.g., a housing or an end bracket, by screwing or the like. However, there is a concern that the structure of the entire system is complicated because of the two complicated stator portions that are formed of wound coils and insulators. Examples of system simplification methods include an axial gap motor having one stator and one rotor. This motor structure is a structure in which a magnetic attraction force generated at a gap portion continues to constantly act in one side direction, resulting in that a large thrust force is kept to be applied to a bearing. Therefore, application to industrial machines has not been advanced in terms of lifetime. PTL 2 proposes a structure that relaxes an attraction force acting on the gap portion. As an axial gap motor having two stators, there has been proposed a structure that makes simplification such that one of the stators is a yoke portion. This is said to enable balancing of the attraction force at the gap portion.

In all the examples described above, the axial gap stator coils have a coil shape in which the coil is wound on a surface perpendicular to the axial direction such that main flux is generated in the rotation axis direction. Such coils are configured to be disposed in plural in the circumferential direction to surround the circumference of a shaft with respect to the rotation axis and fixed together with the stator core. In addition, on the outer circumferential side of the stator, a housing is disposed for the purpose of protecting a portion where the rotor disc rotates. This housing has a role of dissipating the heat of the stator of the motor through the surface of the housing as a heat dissipation fin in addition to preventing of catching into the rotary body. PTL 3 and PTL 4 make studies related to a heat dissipation path design for heat generated in the stator coil of an axial gap motor having two rotors. PTL 3 includes an electrically conductive, highly heat conductive member between the stator coil and the housing and includes a path for conducting Joule heat generated by the coil to an aluminium housing. In addition, PTL 4 studies a method in which a waterway through which water circulates for the heat generated by the coil is formed in the housing, and the heat is released to the outside from the interior of the motor machine by cooling water.

CITATION LIST

Patent Literature

PTL 1: 5635921 B
PTL 2: 2008-199811 A
PTL 3: 2014-17915 A
PTL 4: 2008-92735 A

SUMMARY OF INVENTION

Technical Problem

The axial gap dynamo-electric machine indicated in PTL 1 or the like is characterized by including two disc-shaped rotor magnets having a large diameter to increase torque output, and it has a structure in which the stator is disposed in an axially middle portion and the stator core and the coil are independently disposed with respect to each pole. Therefore, the stator core and the coil are required to be fixed and held so as to be able to withstand the torque reaction force of the motor. Moreover, the rotor is disposed on both axial sides with a small gap, resulting in a structure in which a radial (outer side or inner side) portion of the axially middle portion is fixed. In addition, a fixation member is required to be an electrically nonconductive and nonmagnetic member. Therefore, a structure in which molding is performed using resin material is generally adopted.

In a mold structure in which resin is cast for the stator core and the coil, since the resin has a very low thermal conductivity, the heat dissipation performance of the motor is extremely deteriorated. The resin material has a thermal conductivity of about at most 1 W/m·K, which is lower than 230 of aluminium, 400 of copper, and 70 W/m·K of iron, which are metal materials. Therefore, when the allowable temperature of the motor is determined, the amount of heat generation is restricted by the heat dissipation performance, and the motor capacity per size cannot be large. In addition, most housings are formed of metal material and have a structure of frame grounding. Therefore, an insulation distance from the grounding portion is required. In the case of a 200 V machine, an insulator of 2.4 mm or more and, in the case of 400 V, an insulator of 6.5 mm or more are needed. Therefore, when a resin layer having a thermal conductivity of 1 W/m·K enters the coil, which is a heat source, and the housing, a portion having a very high thermal resistance is formed, resulting in deterioration of the heat dissipation performance. Thus, PTL 3 studies that a member having a high thermal conductivity is inserted into the stator as a heat dissipation path, although it is a member having a small cross-sectional area that covers only two surfaces in the axial direction, in order to increase the heat dissipation performance with the use of the high thermal conductivity of the metal material. However, this method has a problem that a large space into which a highly heat conductive member is inserted cannot be taken or an increase in such space increases the axial size of the motor. In addition, as in the case of PTL 4, when an electrically conductive member is arranged on a side surface portion of the coil, an insulation distance is needed. Thus, the amount of coil disposed in an effective cross-sectional area is reduced, resulting in a possibility that the motor efficiency is reduced. In addition, there is also a possibility that eddy current loss occurs due to coil current or magnet magnetic flux at a portion of the heat dissipation member and the efficiency is further reduced. In addition, the eddy current loss due to current of the coil or leakage magnetic flux of the magnet also occurs in the housing, which is a metal member. The axial gap motor has a structure in which a magnetic body is not disposed outside of the outer circumferential part of the coil. Thus, the eddy current loss of the housing due to the coil current or leakage magnetic flux causes serious problems including heat generation and a reduction in efficiency.

It is an object of the present invention to obtain a structure with which it is possible to improve the heat dissipation performance and efficiency of an axial gap dynamo-electric machine.

Solution to Problem

In order to solve the aforementioned problem, the present invention is an axial gap dynamo-electric machine of such construction that a disc-shaped rotor in which permanent magnets are disposed is provided in the axial direction and a stator is disposed in the axially middle portion, wherein the outer circumferential side of a stator winding is in intimate contact with the inside diameter of a housing, embedding with a mold resin is used for the housing and a stator core and for a stator coil and the housing so that a connection is established with the housing, and the housing includes a nonmagnetic, electrically nonconductive material.

Advantageous Effects of Invention

According to the present invention, it is possible to enable heat conduction to the housing from the coil without the resin, and heat generation of the motor can be reduced. Therefore, it is possible to reduce the coil temperature or the magnet temperature, and it is possible to reduce the resistance value of the coil. Thus, the copper loss (Joule loss) of the coil can be reduced.

BRIEF DESCRIPTION OF DRAWINGS

FIGS. 2A and 2B are views illustrating a state in which a coil and a core of a stator and a housing of an axial gap dynamo-electric machine according to an embodiment of the present invention illustrated in FIG. 1 are fixed by mold resin.

FIGS. 6A and 6B are drawings illustrating dimensions of the coil illustrated in FIG. 5 in a wound state and a dimensional relationship in the case of assembly on a motor.

FIGS. 8A and 8B are drawings illustrating an example of arrangement of a mold in the case where a stator of an axial gap dynamo-electric machine according to an embodiment of the present invention is resin-molded.

DESCRIPTION OF EMBODIMENTS

Figure 1B:
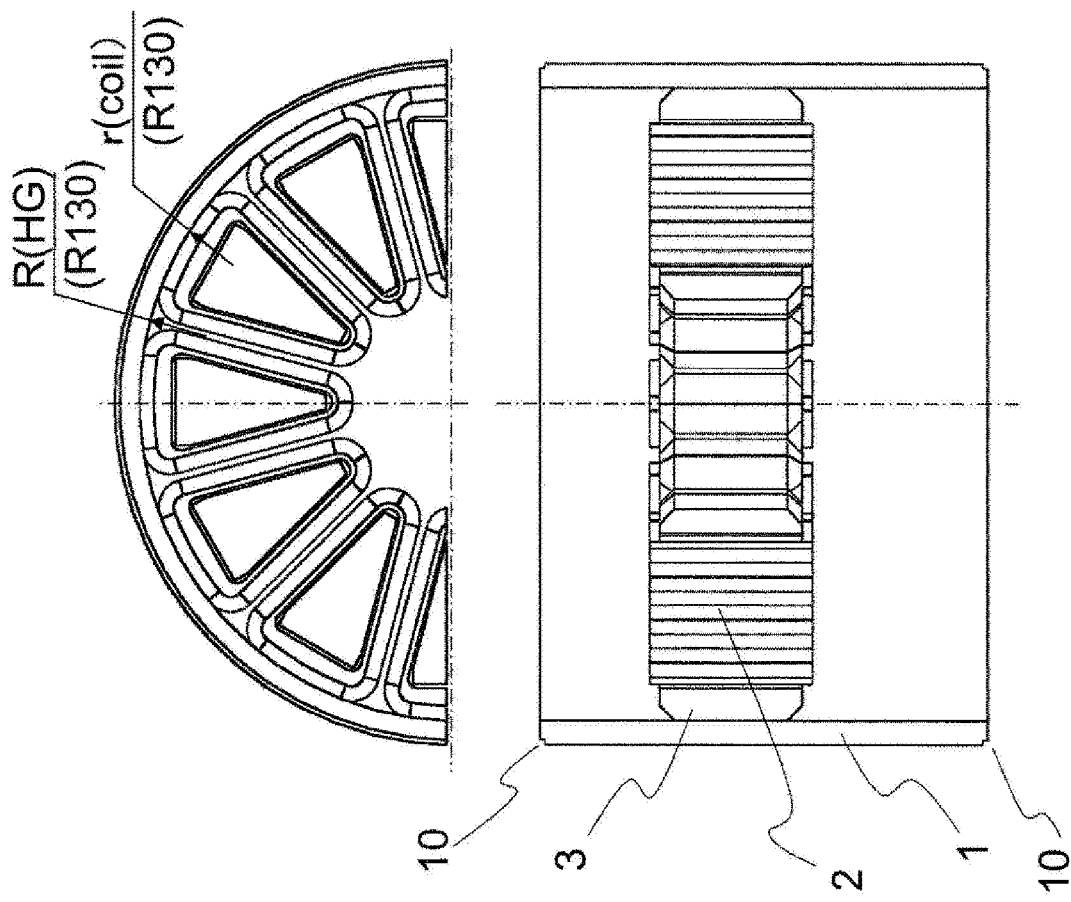
FIGS. 1A and 1B are views illustrating a positional relationship between a coil and a housing in a stator of an axial gap dynamo-electric machine according to an embodiment of the present invention.

An embodiment of the present invention is described below in conjunction with the drawings or the like. The description below indicates a specific example of the content of the present invention, and the present invention is not limited to such description, but can be changed or corrected in various ways by a person skilled in the art within the scope of the technical idea disclosed in the present description. In addition, in all the drawings for describing the present invention, those with like functions are designated with like reference numerals and may not be described repeatedly.

A present example is an axial gap dynamo-electric machine, e.g., of a two-rotor one-stator type, of a structure having two disc-shaped rotors in an axial direction on which a permanent magnet is disposed and a stator disposed in an axially middle portion thereof, and has a structure in which an outer circumferential shape of a stator winding is formed to have the same arc as an inside diameter arc of a housing, with the outer circumferential shape of the stator winding being disposed in intimate contact with an inner circumferential side of the housing, the housing, a stator core, and a stator coil are integrated by being embedded in mold resin. At this time, as to the material of the housing, the housing is formed of a nonmagnetic, electrically nonconductive material. Examples of the material preferably include fine ceramics material such as alumina (aluminium oxide: $Al_2O_3$), silicon nitride: $Si_3N_4$, silicon carbide: SiC, aluminium nitride: AlN, zirconia (zirconium oxide: $ZrO_2$). This is because, in particular, motors for industrial purposes of kW or higher classes require a strength for holding an iron core or a coil that constitutes a stator member, and it is difficult to hold a motor component with a material, e.g., plastic material, in which creep occurs due to temperatures. For the mold resin on the inner circumferential side of the housing, it is structured such that the resin is adhered to overhang on both sides with respect to the length of arrangement of the stator in the axial direction. This is, because ceramics materials are generally weak to shocks, for the purpose of protecting an inner side portion from shocks such as part interference during motor assembly. This is also for making up insufficiency of the holding strength of the resin and the coil at the coil portion because the coil is molded in intimate contact with the housing. In the present example, the magnet temperature can be reduced and the residual magnetic flux density (Br value) of the magnet can be increased. Therefore, it is possible to increase the amount of magnetic flux and reduce the current value in cases where the same torque is output. The copper loss (Joule loss) can also be reduced by such effect. Furthermore, eddy current, which would otherwise be caused at a housing portion due to the current of the coil or the leakage magnetic flux from the magnet does not occur, enabling a reduction in loss at such portion, thereby increasing the efficiency of the motor overall. The axial motor can be formed to be thin, and it is possible to incorporate such a feature into a machine, enabling formation of a machine having a small size and a large output.

EXAMPLE 1

FIG. 1 illustrates a structure of the stator of the axial gap dynamo-electric machine according to an embodiment of the present invention.

Figure 1A:
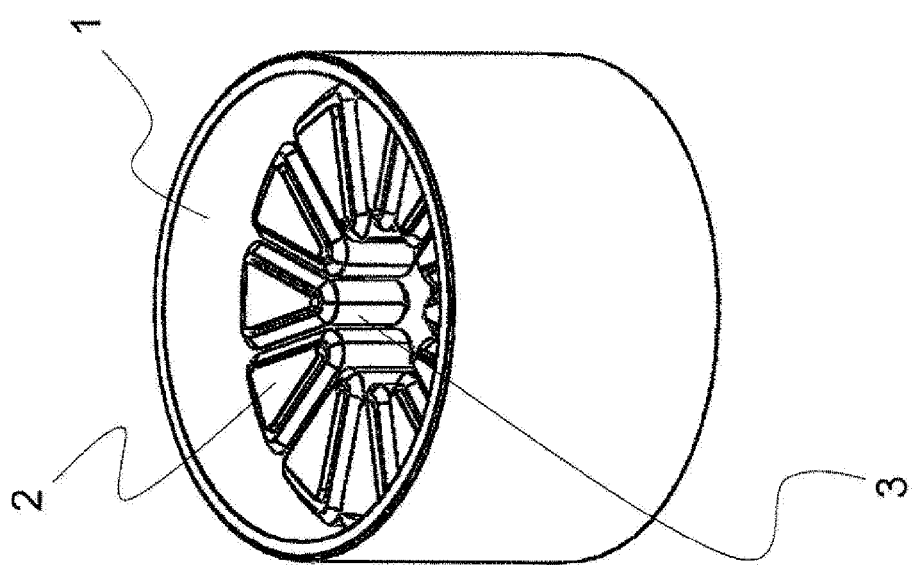

FIG. 1(a) is a perspective view illustrating a positional relationship between a stator core 2, a stator coil wound therearound, and a housing 1. In the example indicated here, at an inner circumferential portion of the housing 1 having a cylindrical shape, twelve sets of cores and coils are disposed at regular intervals in the circumferential direction. FIG. 1(b) illustrates its front view and a transverse cross-sectional view. As illustrated in the transverse cross-sectional view, the stator core and the stator coil are arranged in the vicinity of an axially middle portion of the housing having a cylindrical shape. The outer circumferential side of the coil is arranged to contact the inner circumferential surface of the housing. In the present example, the arc of the arc surface of the outer circumferential side of the coil is r=130 mm. Meanwhile, the arc of the inner circumferential side of the housing is R=130 mm, such that they have the same dimension in design value. This dimension is a design median and is usually designed by setting assembly tolerances or the like. Manufacture is made such that variations in manufacture are within the dimensional tolerances. The coil and the housing designed within the design median can be assembled such that the coil comes into intimate contact with the inner circumferential surface of the housing when the coil is arranged by being pressed from the inner circumference to the outer circumference during assembly. The coil is usually formed in such a manner that an enameled wire is wound several times. Enamel coating is usually a thin film of tens of micrometers, and therefore it is necessary to avoid contact with a metal portion of an electrically conductive body in order to maintain insulation. The present invention has a structure in which the housing and the coil are in intimate contact as described above, and therefore it is necessary that the housing be an electrically nonconductive body. In the present example, the housing is characterized by being formed of ceramic (alumina (aluminium oxide: $Al_2O_3$), silicon nitride: $Si_3N_4$, silicon carbide: SiC, aluminium nitride: AlN, zirconia (zirconium oxide: $ZrO_2$)). Organic materials (resin material) are also electrically nonconductive, but are not preferable in consideration of the holding strength with respect to weight, aging when it is used outdoors, or the like.

FIG. 2 is a drawing illustrating a shape of a resin mold by which the stator core 2, the stator coil 3, and the housing 1 of the present example illustrated in FIG. 1 are integrated in a state where their positional relationship is maintained. In the present example, resin molding is performed with the outer circumferential surface of the stator coil 3 being closely attached to the inner circumferential surface of the housing 1. Therefore, the stator coil 3, the stator core 2, and the housing 1 cannot have a large joining surface. Therefore, as illustrated in the present drawing, a way of winding the stator coil 3 is devised such that the number of windings on both axial sides of the outer circumferential surface is reduced to allow the resin to enter the interface between the housing 1 and the stator coil 3. Furthermore, it is structured such that the resin is arranged in the inner circumferential portion of the housing also at both axial side portions where the stator is not arranged. The resin on the inner circumferential side has a draft angle of about 1.5 degrees for release of a mold for molding. The present example has a structure in which the resin is arranged up to an axial end of the ceramic housing 1, and a fitting portion for positioning in the case of assembly as a motor is an outer cutout structure 10. This outer cutout structure has this structure on both sides also for a purpose that the processing precision e.g., coaxiality, increases when processing is performed without resetting of a chuck during processing using a lathe. Another purpose is to prevent defects such as cracking or chipping during processing or when ceramic material is fixed to a lathe because ceramic material is difficult to process after fired. In the present embodiment, the ceramic housing having a cylindrical shape is assumed to be used without both the outer circumferential surface and the inner circumferential surface being processed after molding and firing. It is structured such that processing is only performed on a portion (cutout 10) that fits to a bracket of the motor and an axial length.

Figure 3A:
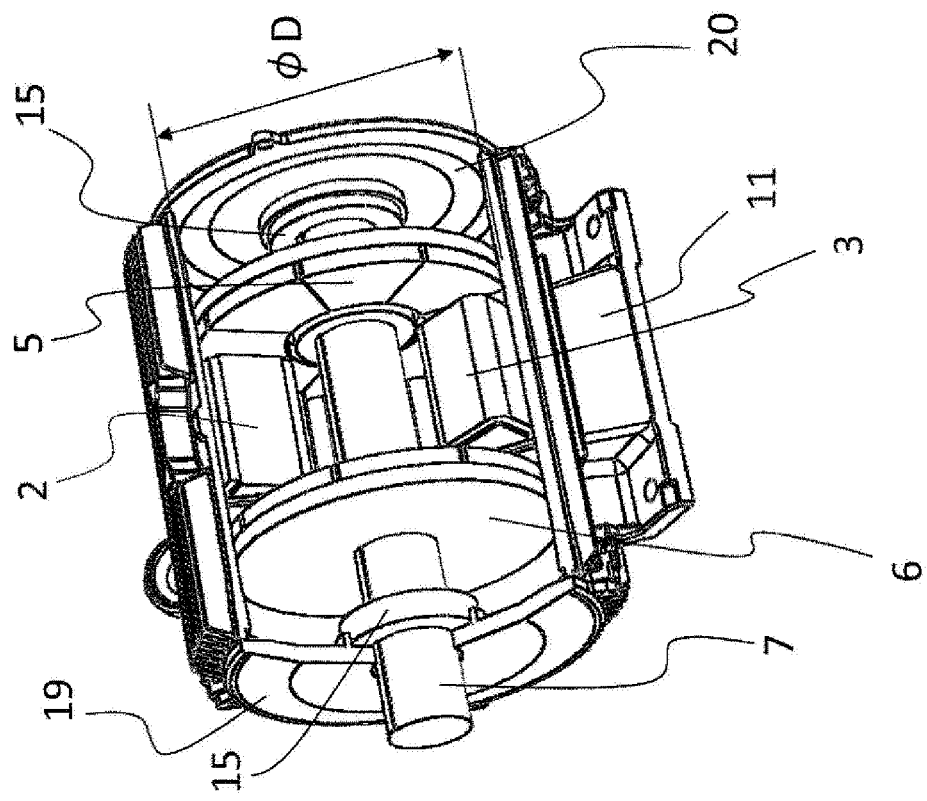
FIGS. 3A and 3B are structure comparative diagrams that compare an axial gap motor using a rotor of the present invention and a general radial gap motor.
Figure 3B:
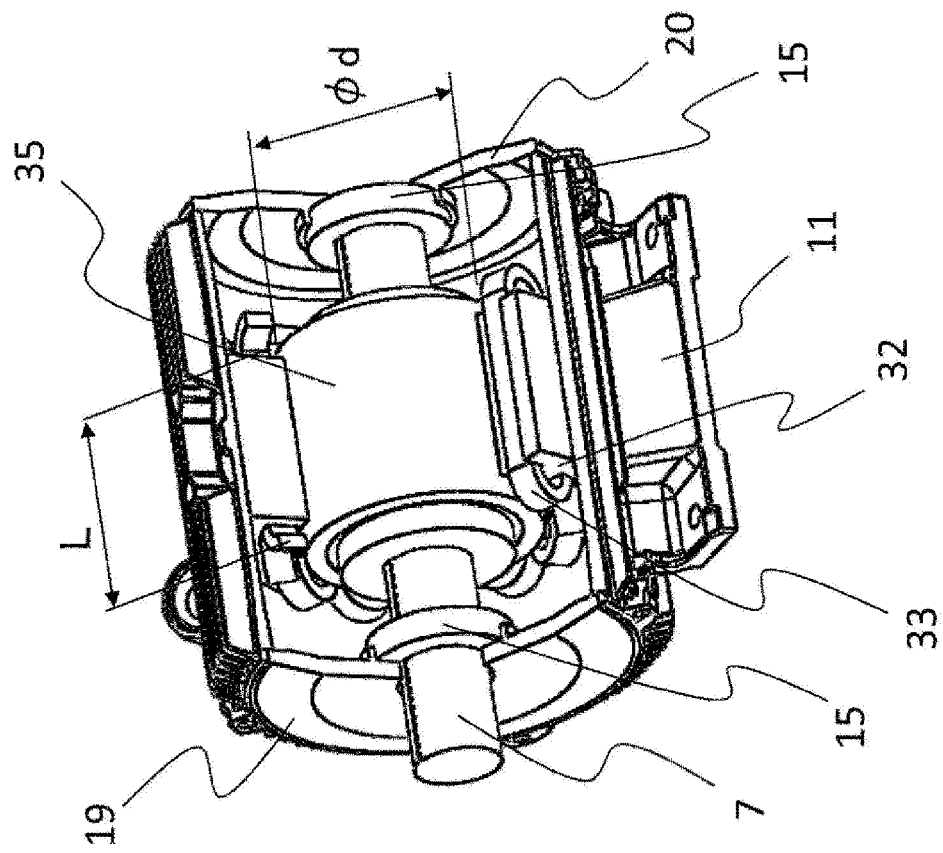

Next, a difference between the axial gap motor and the radial gap motor is described in conjunction with FIG. 3. FIG. 3 illustrates a structural comparison between a general radial gap dynamo-electric machine and the axial gap dynamo-electric machine in perspective view. FIG. 3(a) drawing illustrates a radial gap dynamo-electric machine, and FIG. 3(b) illustrates an axial gap dynamo-electric machine. The present comparison example illustrates the case where both are supposed to be mounted on the same housing 11. At this time, in the radial gap dynamo-electric machine, a stator iron core 32 obtained as electromagnetic steel plates having a groove called slot for mounting a winding (coil) 33 are axially stacked is formed on an inside diameter portion of the housing 11. Furthermore, on an inner side portion thereof, a rotor including a permanent magnet 35 mounted on a rotation shaft 7 is formed. At this time, a facing area between the rotor and the stator is determined by diameter φd and axial length L of the rotor, and its size is π×d×L. Because the diameter of the rotor is on an inner side of the stator with respect to the diameter of the housing, d is small. Meanwhile, the axial gap dynamo-electric machine illustrated in FIG. 3(b) is illustrated to have a rotor 6 on which two permanent magnets are mounted. With this structure, a facing area between a rotor magnet 5 and a stator core 2 is a large area such that rotor diameter φD can be used to the end of the inside diameter of the housing. In the illustrated model, the facing area is twice of $\pi/4 \times D_2$. With this model, this value is about three times larger as compared with the radial gap dynamo-electric machine described before. From this fact, in the case of being mounted in the housing having the same diameter, the axial gap dynamo-electric machine is understood to have an advantage to obtain a larger torque than the radial gap dynamo-electric machine.

Here, in the case of the radial dynamo-electric machine, it can be seen that it is structured such that the magnetic flux generated by the coil is converted into torque between the rotor and the gap via the stator core. In addition, it can be seen that it is structured such that the Joule heat generated by the coil is transferred to the stator core by heat conduction and the heat is further transferred to the housing by heat conduction. The thermal conductivity of the coil (copper) is usually 400 W/m·K, the thermal conductivity of the stator core (iron) is 70 W/m·K, the housing is usually aluminium or the like. In this case, it is formed of a material having a relatively high thermal conductivity of 100 to 200 W/m·K such that the heat dissipation performance is high. In the case of the axial gap type illustrated in (b), it is structured such that a space between the coil and the housing is filled with resin. Usually, to fulfill insulation performance, it is necessary to have an insulation distance of 2.4 mm in the case of 200 V motors and of about 6.5 mm in the case of 400 V motors. Therefore, it is structured such that mold resin is poured a little more than the distance, and because the thermal conductivity of the resin is very low at 0.6 W/m·K, the heat of the coil is less transferred to the housing. When the heat dissipation of the coil is poor, an increase in temperature of the coil increases the resistance value, thereby increasing copper loss (Joule loss), and an increase in magnet temperature of the magnet on the rotor side increases the motor current, causing a considerable reduction in motor efficiency.

Figure 4:
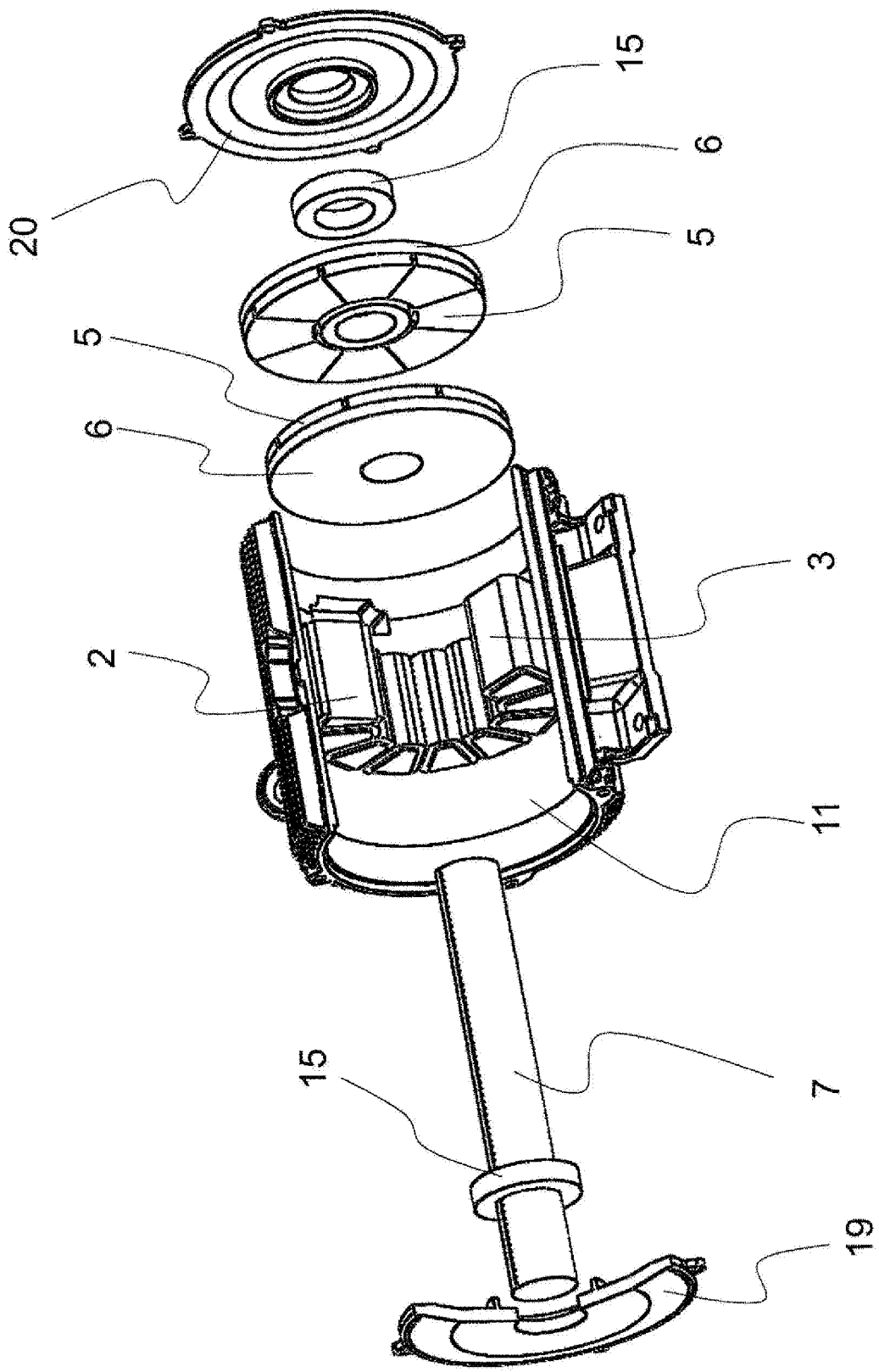
FIG. 4 is a view illustrating a structure of an axial gap dynamo-electric machine according to an embodiment of the present invention.

FIG. 4 illustrates an exploded perspective view of an assembly structure of the axial gap dynamo-electric machine. The stator core 2 and the stator coil 3 are integrated with the housing 11 by resin molding. A rotor 6 is arranged on both sides thereof. Permanent magnets 5 are equally arranged on the surface of the rotor 6 in the circumferential direction, forming eight poles in the drawing of the present example. These two discs are structured to be fastened by a shaft 7 and are rotatable together with the shaft. The shaft is structured to be rotatably held via bearings 15 held by front and rear end brackets 19, 20. The end brackets are structured to be combined with the end surface of the housing while the coaxiality is maintained.

Figure 5C:
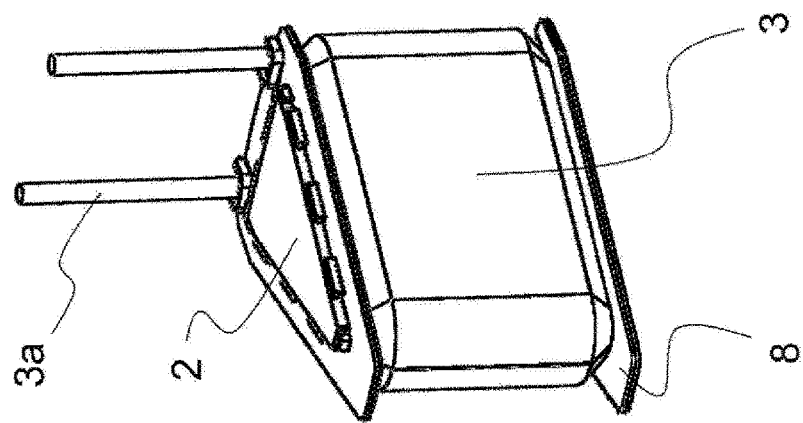
FIGS. 5A to 5C are drawings illustrating a positional relationship between a stator core, a coil bobbin and a coil of an axial gap dynamo-electric machine according to an embodiment of the present invention.
Figure 5B:
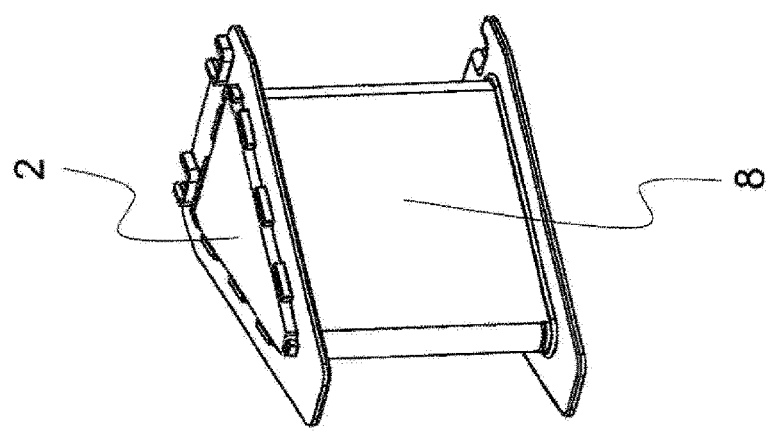
Figure 5A:
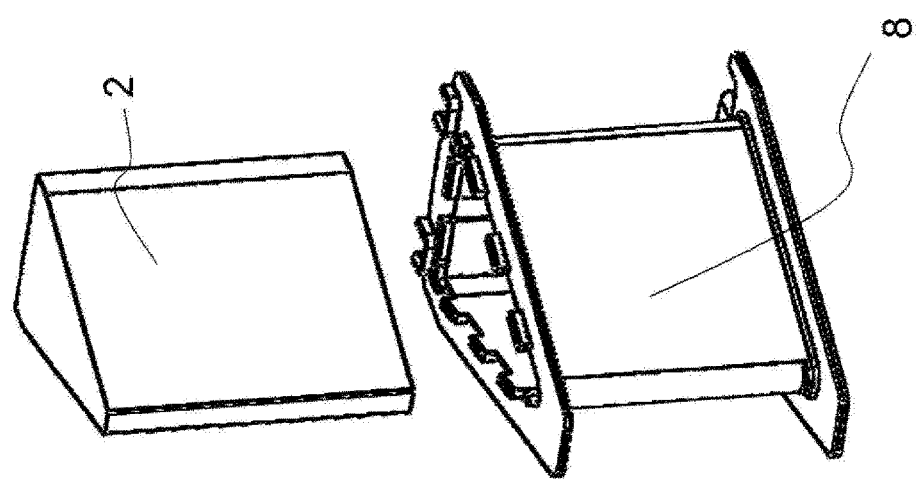

FIG. 5 illustrates a detailed structure of the stator coil. FIG. 5(a) drawing is a view illustrating a positional relationship between the stator core 2 and a winding bobbin 8. The stator core 2 has a roughly triangular column shape, which is a shape that can be axially inserted into a hole of the winding bobbin. A state in which the stator core 2 is inserted into the winding bobbin is illustrated in FIG. 5(b). FIG. 5(c) illustrates a state in which a winding is wound thereon. A winding is wound in a direction of surrounding the stator core 2, and end lines at the start of winding and the end of winding are axially arranged through grooves cutout at ends of the winding bobbin 8.

FIG. 6(a) indicates a winding bulge of the coil after the winding is wound around the coil. When the coil is viewed from above in the axial direction, the coil can protrude 3b, 3c from a brim portion of the winding bobbin 8 due to the winding bulge. In this state, the arrangement in the housing of the motor cannot be performed, and therefore shaping for adjusting the shape is performed. FIG. 6(b) drawing illustrates a view of dies for shaping the coil. The dimension is adjusted in such a manner that pressing is performed through the use of a pressing apparatus, e.g., a press, against a die that is set to be identical to the final finished dimension of the coil or slightly smaller in consideration of springback. At this time, the dimension of the surface of the outer circumferential portion that contacts the housing is made to be identical to the inside diameter dimension of the housing as described above. At this time, R is 130 mm, and a dimensional tolerance of −0.05 to −0.1 mm is set to allow for assembly.

Figure 7B:
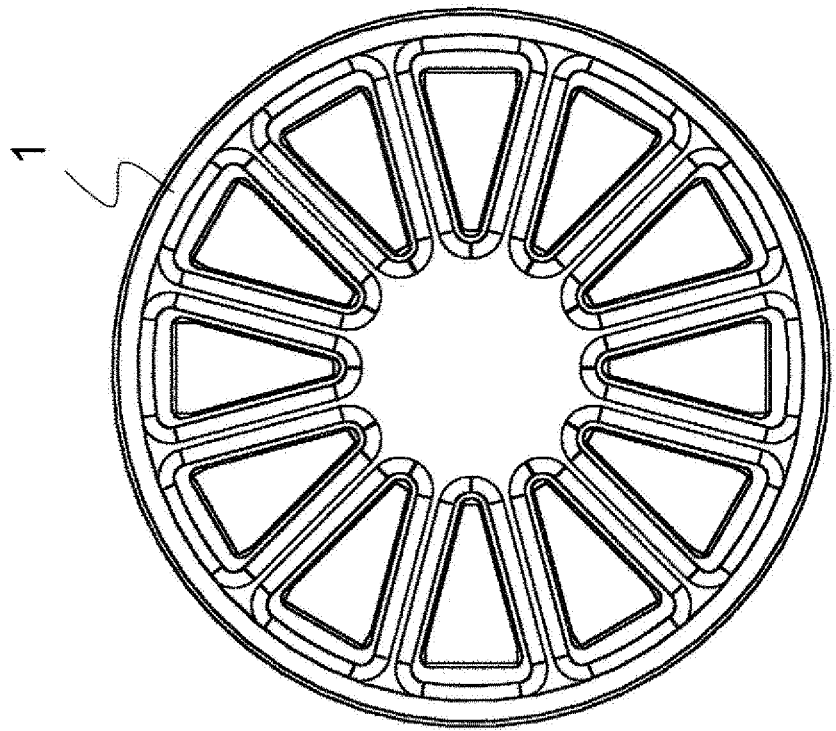
FIGS. 7A and 7B are drawings comparing a positional relationship between a coil and a housing of an axial gap dynamo-electric machine according to an embodiment of the present invention with a conventional motor.
Figure 7A:
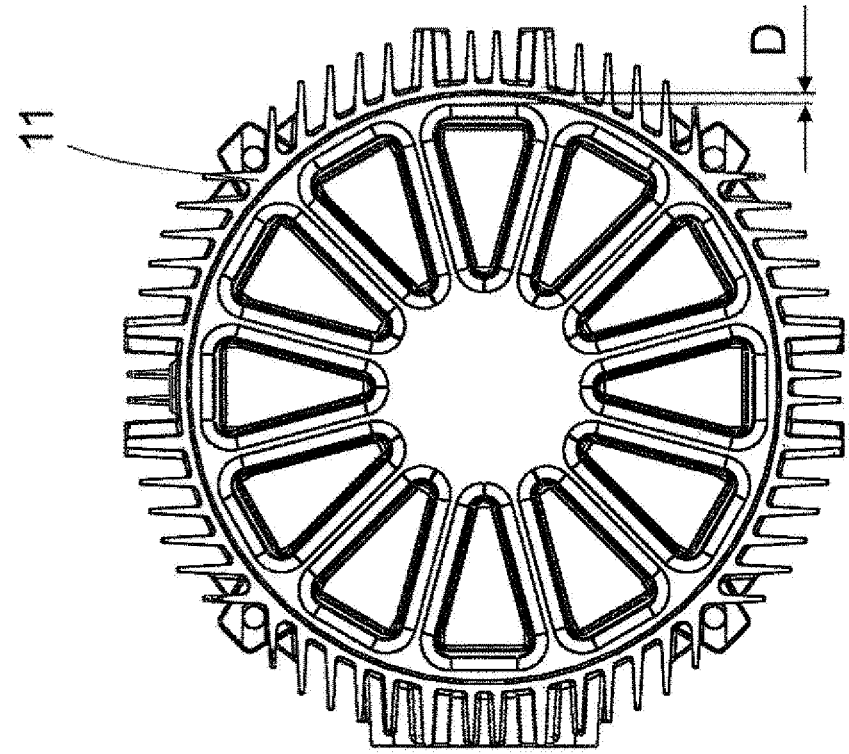

FIG. 7 illustrates a comparison of cross sections of the housing and the position of the coil. FIG. 7(a) illustrates the case of a conventional aluminium housing. Distance D must be provided for arrangement between the end surface of the coil and the inside diameter of the housing. This is a dimension determined for maintaining the insulation performance. FIG. 7(b) illustrates an embodiment of the present invention. Ceramic is an insulator and has no problems with contact with the coil. This enables arrangement in contact. In the case of an aluminium housing, a heat dissipation fin is formed on an outer surface. This is because it can be relatively easily formed by molding of aluminium casting or die casting. In the case of ceramic, processing is difficult. Therefore, a complicated shape is currently difficult to make. In the present embodiment, the shape is simply cylindrical.

Next, FIG. 8 illustrates a configuration example of dies during molding. A lower die 41 is arranged with respect to the housing 1 of the present embodiment. This positioning is performed for assembly with reference to the outer cutout portion 10 of the ceramic housing. A shaft die 42 is arranged at a middle part of the lower die to enable formation of a mold portion on the inner circumferential side. With reference to that shaft, an upper die is arranged to form a gap of the mold portion. Mold resin 4 is poured into the gap to perform molding. At this time, the point is the feature that there is no die contact point on the inner circumferential surface side of the housing. In the resin mold molding using dies, the resin is hardened by an increase in temperature. The aforementioned is for the purpose of preventing cracking in the housing due to expansion of the dies. Usually, the ceramic material has a low coefficient of linear expansion, and is less expanded due to temperatures. As a resin material to be used, those corresponding to the coefficient of linear expansion of the housing are used. The dies are metal material and expand from 15 to 20 ppm. Therefore, cracking can occur in the housing when the dies are expanded. The cutout portion 10 of the housing, which is for fitting, is on the outer side. This is because the expansion of the mold die spreads outward in the direction in which the gap opens, which can be a direction in which the cracking in the housing can be prevented. FIG. 8(b) illustrates a cross section of the stator in a state where the dies are removed. The upper and lower dies both can easily be removed by draft.

Figure 9B:
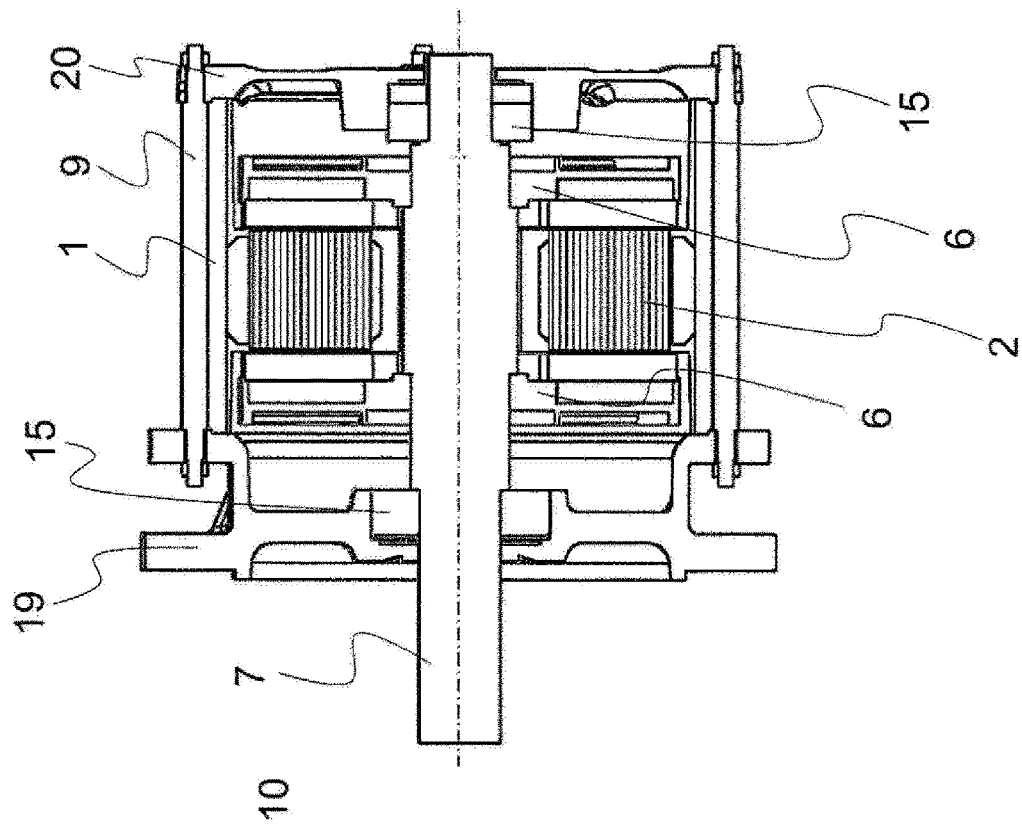
FIGS. 9A and 9B are views illustrating a structure of an axial gap dynamo-electric machine according to an embodiment of the present invention.
Figure 9A:
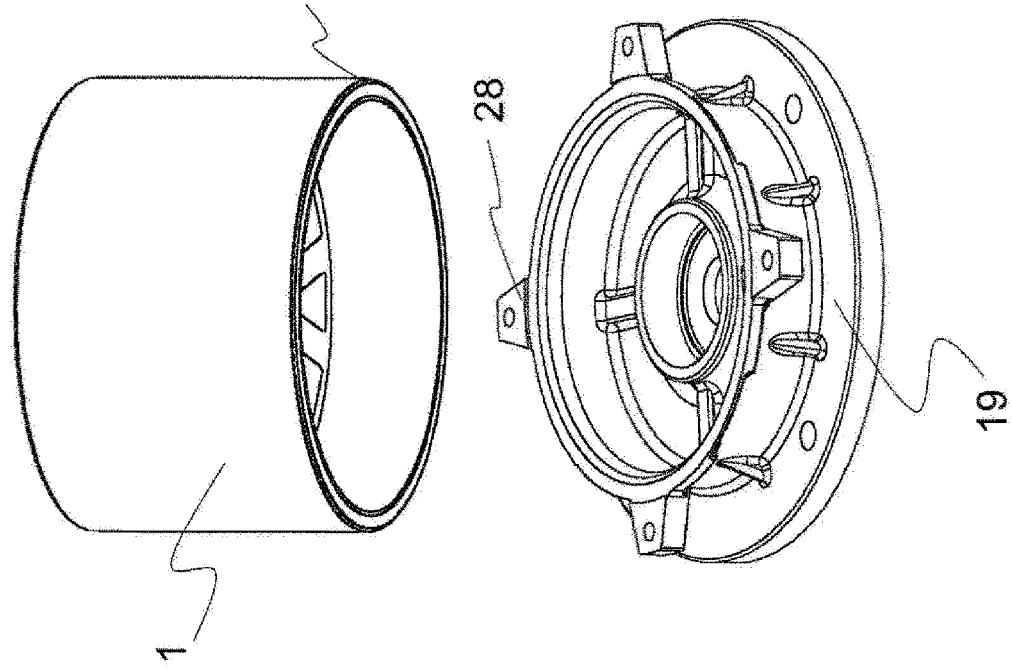

FIG. 9 is a drawing illustrating an assembly structure of an axial gap motor using the ceramic housing of the present invention. FIG. 9(a) illustrates a state where the end bracket 19 on the output shaft side is assembled with the housing 1. The output shaft-side end bracket has a structure of including an inner cutout portion 28 so as to be capable of being assembled with the outer cutout structure 10 of the housing side. Both axial ends of the housing have an outer spigot joint cutout structure such that it is structured such that the heat of the coil is transferred from the coil to the housing by heat conduction, and a large amount of heat can be transported from the housing to the end brackets or a mounting base. In the present example, the inner circumferential cutout portion 28 on the output shaft-side end bracket is formed to be present, not across the entire circumference, but at only protrusion portions provided at four points in the circumferential direction. This is for the purpose of preventing reduction in assemblability due to the presence across the entire circumferential portion. FIG. 9(b) illustrates a transverse cross-sectional view of the motor assembly structure. The end bracket 19 holds the shaft 7 coupled with the rotor 6 via a bearing 15. The end bracket 20 on the opposite side also has an structure of having an inner cutout portion that fits to the outer cutout portion 10 of the housing similar to the output shaft side so as to be combined and held. Both end brackets have a structure of being coupled by a stepped shaft 9, and the stepped shaft 9 has a structure of being externally threaded at both ends and the end brackets are held together by friction by fastening with a nut. At this time, when tightening is performed using a nut, the stepped part of the stepped shaft 9 is subject to a stress and held, and a large concentrated stress does not apply to the end surface of the ceramic housing.

Figure 10B:
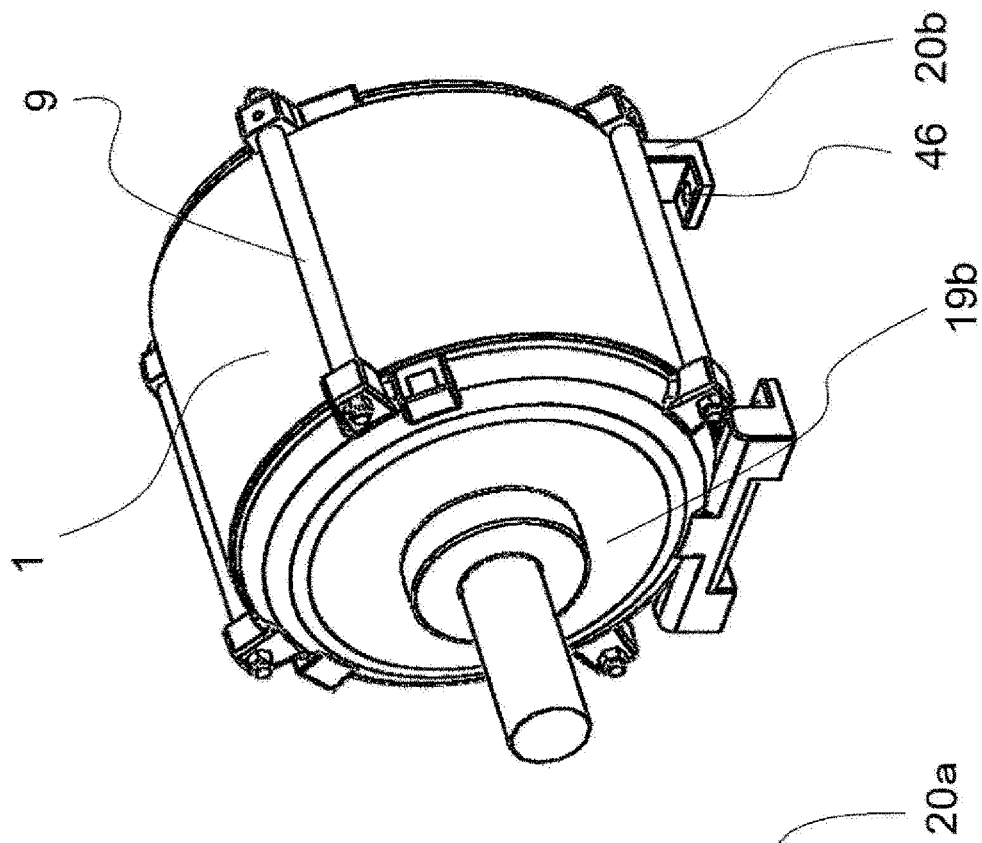
FIGS. 10A and 10B are views illustrating an external appearance structure of an axial gap dynamo-electric machine according to an embodiment of the present invention.
Figure 10A:
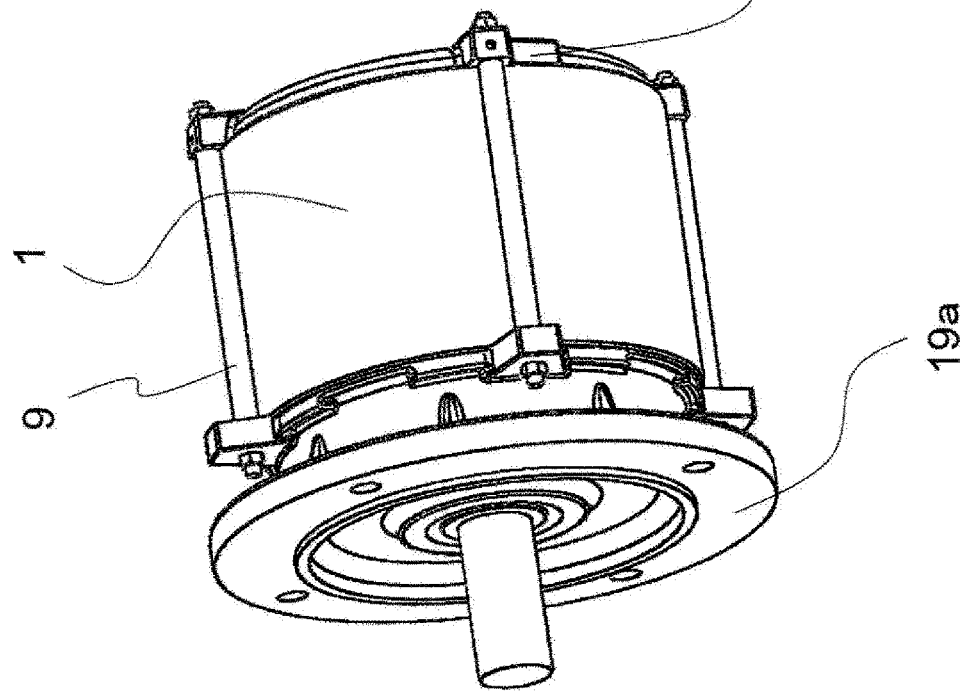

FIG. 10 illustrates an external appearance view of an assembled state as a motor. The external appearance of the structure illustrated in FIG. 9(b) is FIG. 10(a). It is a flange attachment-type motor structure, which is a structure in which neither stress nor shock applies to the ceramic housing portion for attachment on the machine side using a flange attachment portion. FIG. 10(b) illustrates an example of a leg attachment-type structure. Similar to the flange attachment type, it is a structure in which front and rear end brackets 19b, 20b and the stepped shaft 9 hold the ceramic housing portion including the stator. A leg cannot be formed on the housing portion like a typical motor. Therefore, a leg portion is provided at a part of the end bracket and that portion supports the deadweight of the motor, and a hole 46 for attaching to the machine side is provided.

REFERENCE SIGNS LIST

1 ceramic housing
2 stator core
3 stator coil
4 mold resin
5 permanent magnet
6 rotor
7 shaft
8 winding bobbin
9 stepped shaft
10 housing outer cutout portion
11 aluminium die cast housing
15 bearing
19 output shaft-side end bracket
20 opposite output shaft-side end bracket
21 coil molding die (lower die)
22 coil molding die (upper die)
41 molding die (lower)
42 mold shaft
43 molding die (upper)
44 resin container

The invention claimed is:

1. An axial gap dynamo-electric machine of a structure comprising a disc-shaped rotor where a permanent magnet is disposed in an axial direction and a stator disposed at a middle portion in the axial direction, wherein an outer circumferential side of a stator winding is in intimate contact with an inside diameter of a housing, a stator core and a stator coil are connected to the housing by a resin material, and the housing comprises a nonmagnetic, electrically non-conductive material;
wherein the housing that is nonmagnetic, electrically nonconductive has a cylindrical shape, both axial ends thereof have a cutout in which a bracket having a circular shape can be combined and arranged coaxially, and the cutout cuts an outer side surface of the housing.

2. The axial gap dynamo-electric machine according to claim 1, wherein the housing comprises any of aluminium oxide, silicon nitride, silicon carbide, aluminium nitride, and zirconium oxide.

3. The axial gap dynamo-electric machine according to claim 2, wherein the resin material connecting the housing, the stator coil, and the stator core is provided on an inner side surface of the housing.

4. The axial gap dynamo-electric machine according to claim 3, wherein the resin material has an angle in the axial direction and varies in thickness.

5. The axial gap dynamo-electric machine according to claim 1, wherein the housing that is nonmagnetic, electrically nonconductive has a cylindrical shape, and an inner side surface and an outer side surface are in a surface state where cutting is not carried out after firing and molding.

6. The axial gap dynamo-electric machine according to claim 1, wherein after the stator coil is wound, winding bulge is deformed in a coil state such that a shape of a coil end portion that becomes an outer circumferential side has a shape that fits an inside diameter of the housing.

7. The axial gap dynamo-electric machine according to claim 1, comprising a means of sandwiching the stator with end brackets arranged at both ends in the axial direction, wherein the sandwiching means has a structure in which a long shaft that is externally threaded at both ends is inserted through the brackets, an end portion of the external thread is tightened with a nut such that the stator is held by sandwiching friction between the housing and the end brackets.

8. The axial gap dynamo-electric machine according to claim 1, further comprising end brackets and a plurality of stepped long shafts arranged around an outer surface of the housing which are configured to sandwich the stator of an axial gap motor in which the housing is formed of a ceramic member, with the end brackets arranged at both axial ends, wherein each of the stepped long shafts has a parallel portion identical to an axial length of the housing, is externally threaded at both ends, is inserted through brackets, and an end of the external thread is tightened with a nut such that the stator is held by sandwiching friction between a parallel surface of the stepped long shaft, an end surface of the housing, and the end brackets.

9. The axial gap dynamo-electric machine according to claim 7, wherein the housing is formed of ceramic material, and the housing has a cylindrical shape, deadweight of a motor is supported at a part of end brackets at both ends and a hole for attaching to a floor surface is arranged.

10. An axial gap dynamo-electric machine comprising:
a disc-shaped rotor where a permanent magnet is disposed in an axial direction;
a stator disposed at a middle portion in the axial direction, wherein an outer circumferential side of a stator winding is in intimate contact with an inside diameter of a housing, a stator core and a stator coil are connected to the housing by a resin material, and the housing comprises a nonmagnetic, electrically nonconductive material;
end brackets; and
a plurality of stepped long shafts arranged around an outer surface of the housing which are configured to sandwich the stator of an axial gap motor in which the housing is formed of a ceramic member, with the end brackets arranged at both axial ends, wherein each of the stepped long shafts has a parallel portion identical to an axial length of the housing, is externally threaded at both ends, is inserted through brackets, and an end of the external thread is tightened with a nut such that the stator is held by sandwiching friction between a parallel surface of the stepped long shaft, an end surface of the housing, and the end brackets.

* * * * *